GEORGE F. SCHROEDER
RONALD Y. PARADISE
INVENTORS
BY S. A. Giarratana
George B. Oujevolk
ATTORNEYS Jan. 1, 1963

G. SCHROEDER ETAL 3,071,324

SYNCHRO TO DIGITAL CONVERTER

Filed Feb. 10, 1961

9 Sheets-Sheet 2

GEORGE F. SCHROEDER
RONALD Y. PARADISE

INVENTORS

BY S. A. Giarratana
George B. Oujevolk

ATTORNEYS

GEORGE F. SCHROEDER
RONALD Y. PARADISE
INVENTORS
BY S. A. Giarratana
George B. Oujevolk
ATTORNEYS GEORGE F. SCHROEDER
RONALD Y. PARADISE
INVENTORS
BY S. A. Giarratana
George B. Oujevolk
ATTORNEYS Jan. 1, 1963 G. SCHROEDER ET AL 3,071,324
SYNCHRO TO DIGITAL CONVERTER
Filed Feb. 10, 1961 9 Sheets-Sheet 5

GEORGE F. SCHROEDER
RONALD Y. PARADISE
INVENTORS
BY S. A. Giarratana
George B. Oujevolk
ATTORNEYS GEORGE F. SCHROEDER
RONALD Y. PARADISE
INVENTORS
BY S. A. Giarratana
George B. Oujevolk
ATTORNEYS Jan. 1, 1963 G. SCHROEDER ETAL 3,071,324

SYNCHRO TO DIGITAL CONVERTER

Filed Feb. 10, 1961 9 Sheets-Sheet 7

GEORGE F. SCHROEDER
RONALD Y. PARADISE
INVENTORS

BY S. A. Giarratana
George B. Oujevolk
ATTORNEYS

SYNCHRO TO DIGITAL CONVERTER

Filed Feb. 10, 1961

GEORGE F. SCHROEDER
RONALD Y. PARADISE
INVENTORS
BY S. A. Giarratana
George B. Oujevolk
ATTORNEYS Jan. 1, 1963

G. SCHROEDER ETAL 3,071,324

SYNCHRO TO DIGITAL CONVERTER

Filed Feb. 10, 1961

9 Sheets-Sheet 9

GEORGE F. SCHROEDER
RONALD Y. PARADISE
INVENTORS

BY [signatures]

ATTORNEYS

United States Patent Office 3,071,324

Patented Jan. 1, 1963

3,071,324

SYNCHRO TO DIGITAL CONVERTER

George Schroeder, Pines Lake, Wayne Township, and Ronald Y. Paradise, Hillsdale, N.J., assignors to General Precision Inc., Little Falls, N.J., a corporation of Delaware Filed Feb. 10, 1961, Ser. No. 88,330
13 Claims. (Cl. 235—154)

The present invention relates to an angle readout, and more particularly to the furnishing of an angular position from information derived from a synchro or resolver.

Rotating devices furnishing angular information are widely used in computer circuitry. Typical of such devices now in common use are synchros and resolvers. These devices will furnish the sine and cosine of an angle. The synchro in its simplest embodiment includes a transformer primary and a Y-shaped secondary winding. One winding is movable with respect to the other in response to some motion or input. The angular position of the Y-shaped secondary with respect to the primary provides output voltages which can be used to obtain the sine and cosine of the angle. Although for some computer operations no angle readout is required, in other operations, it is advantageous to have a rapid angular readout. Attempts have been made to introduce this feature by various methods, e.g., by measuring pulse time between zero crossings. This however introduces numerous complications in the circuitry and is subject to distortion and error. Reading the angle directly from the sine or cosine presents certain difficulties as neither the sine nor the cosine functions exhibit sufficient linear characteristics to provide a readily convertible angular readout. Although attempts may have been made to provide a rapid angular readout directly from a synchro or resolver, none, as far as we are aware have ever been too successful when put into practice in actual operation.

It has now been discovered that an angular readout from a synchro or resolver can be readily provided.

Thus, it is an object of the present invention to provide readable angular information.

Another object of the present invention is to provide an angular readout from a synchro or resolver.

Still another object of the present invention is the construction of a network which will provide a monotonic increasing function, or decreasing function.

Yet another object of the present invention is to provide the foregoing results by means of a ratio effect between the sine and cosine outputs so as to operate from almost any input voltage or frequency.

The present invention also contemplates providing an arrangement whereby an electrical circuit may furnish electrical values corresponding to desired mathematical functions.

With the foregoing and other objects in view, the invention resides in the novel arrangement and combination of components and in the details of construction hereinafter described, it being understood that changes in the precise embodiment of the invention herein disclosed may be made within the scope of what is described without departing from the spirit of the invention.

Broadly stated, the present invention contemplates providing a network adapted to furnish tangent-cotangent electrical equivalent values between about 0° and about 45° into which is fed one of the outputs from a sine-cosine source, e.g., from a synchro or resolver; overload switch means allowing only electrical values through said network which are less than values flowing thereto; and, comparator means into which is fed the other of the outputs from said source and the output from said network. The particular arc of the circle in which the angle sensed by the source is located will be supplied by logic means.

The advantages of the invention will become apparent from the following description taken in conjunction with the accompanying drawing in which.

Figure 14:
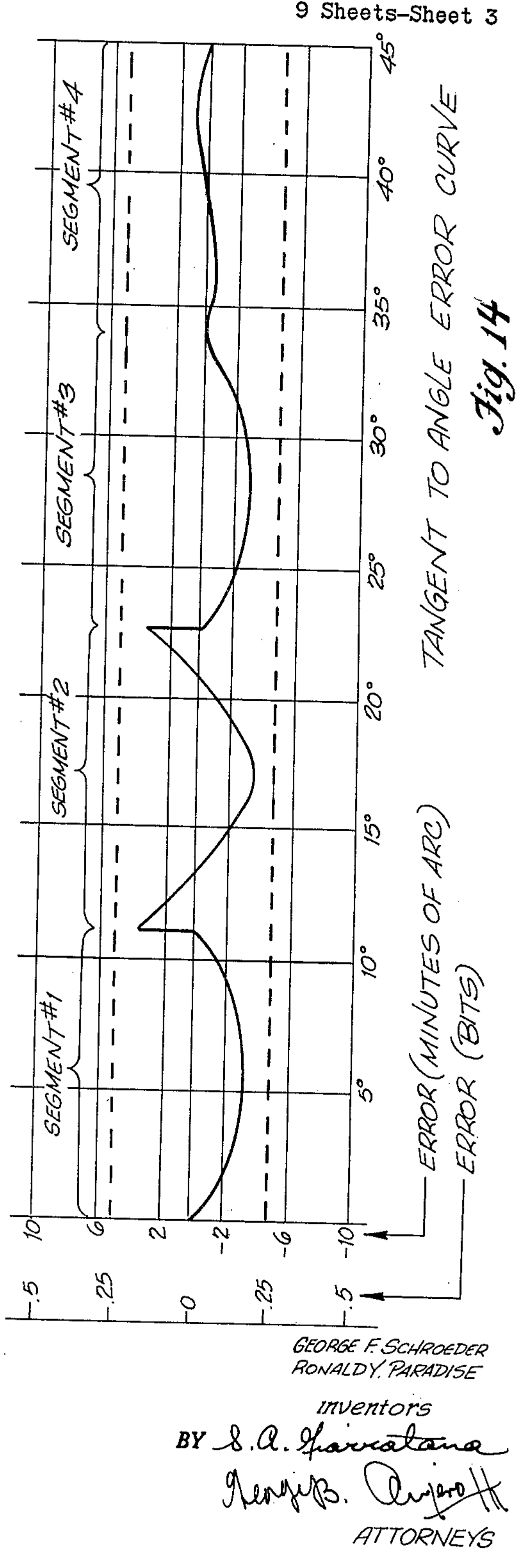
Figure 6:
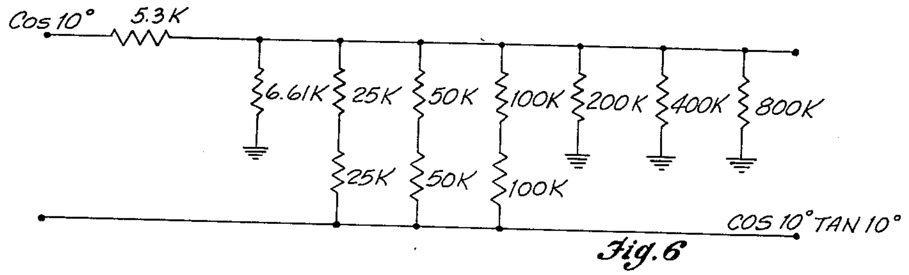
Figure 7:
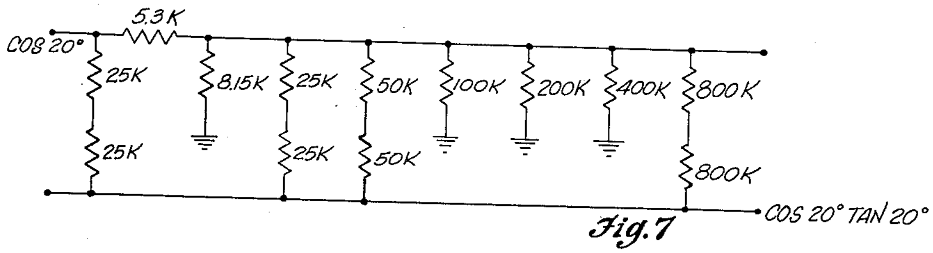
Figure 8:
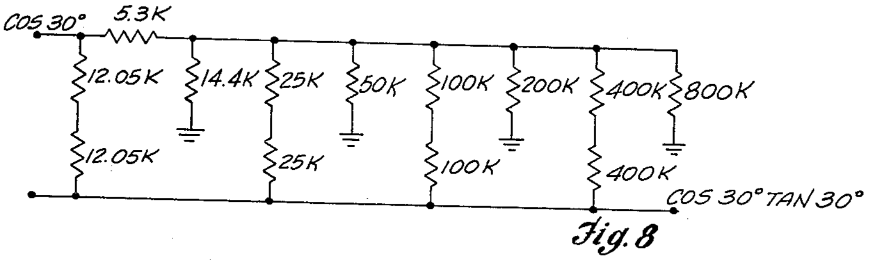
Figure 9:
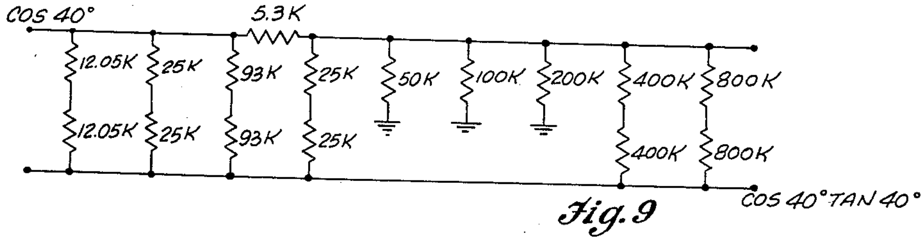
Figure 10:
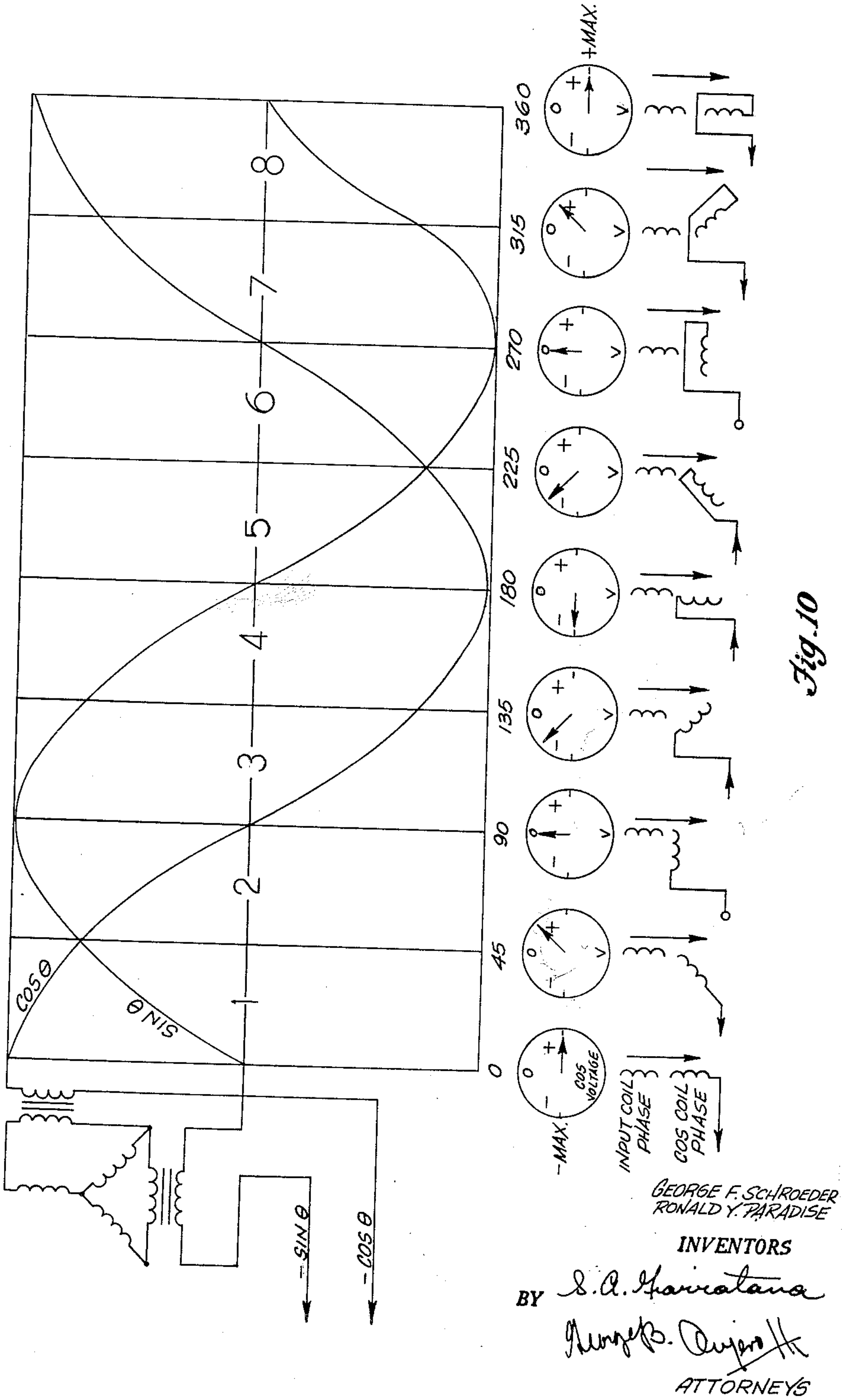
Figure 11:
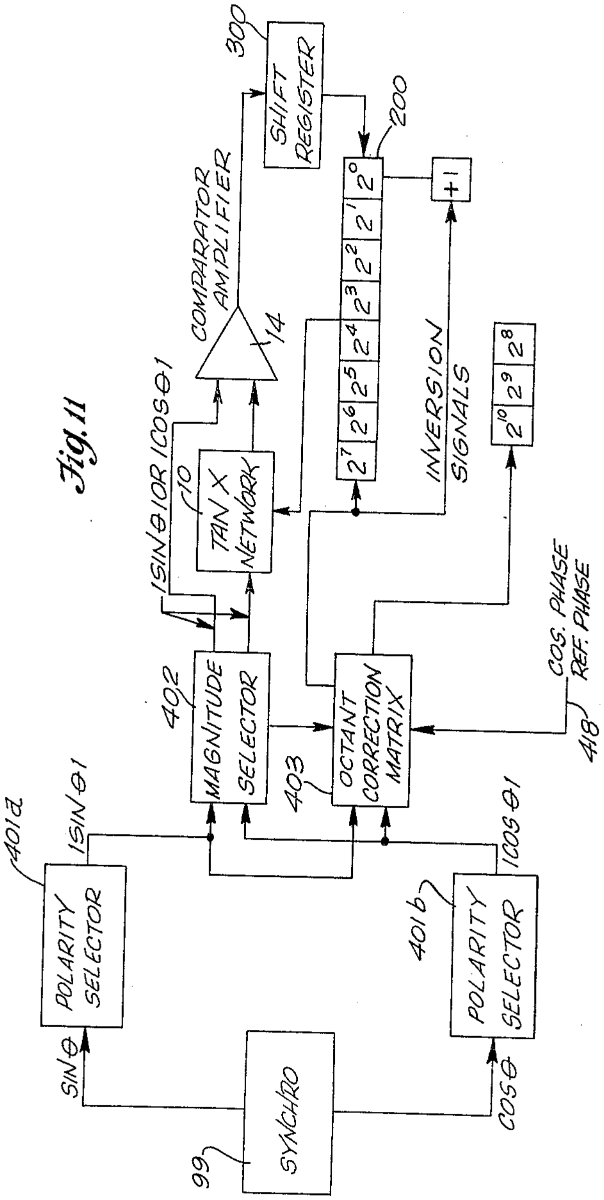
Figure 12:
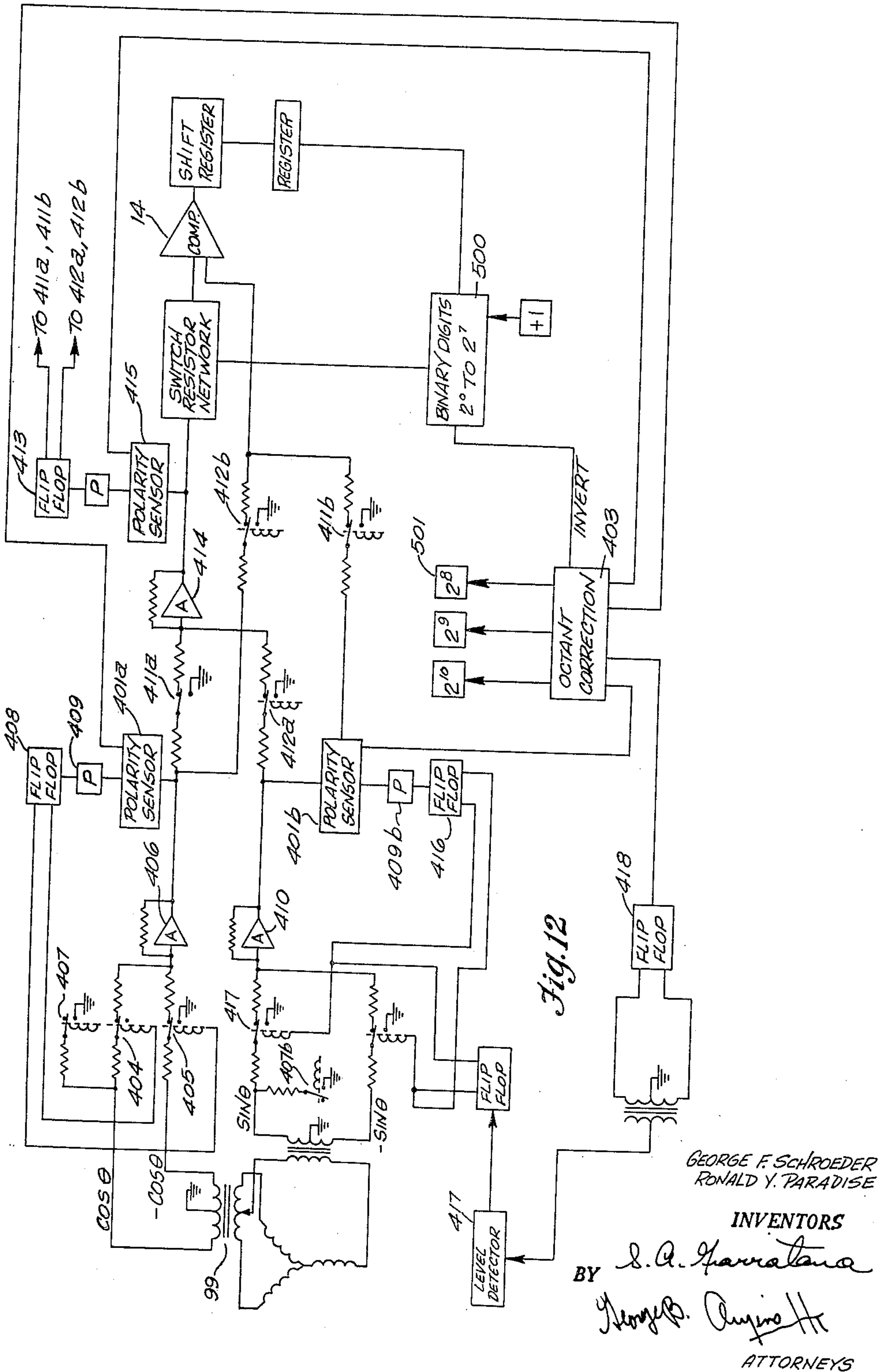
Figure 13:
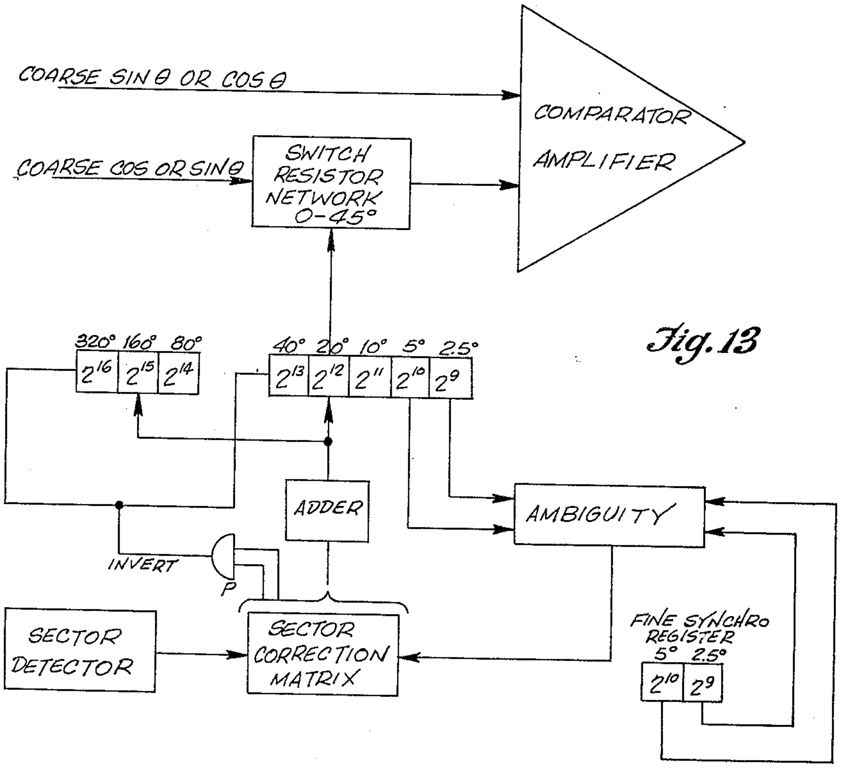

FIGURE 6 gives the electrical resistor equivalent network corresponding to the theoretical 10° readout;

FIGURE 7 gives the electrical resistor equivalent network corresponding to the theoretical 20° readout;

FIGURE 8 gives the electrical resistor equivalent network corresponding to the theoretical 30° readout;

FIGURE 9 gives the electrical resistor equivalent network corresponding to the theoretical 40° readout;

FIGURE 10 shows in graph and symbol form the eight octants of a circle, the position of the sine and cosine in each octant, and the phase of the cosine with respect to the signal reference, i.e., phase of the cosine secondary with respect to the excitation primary signals;

FIGURE 11 gives in block diagram the units required in connection with octant selection;

FIGURE 12 is a detailed schematic diagram of the conversion system given in block diagram in FIGURE 11;

FIGURE 13 shows in block diagram the sector or octant selection when there is both a coarse input and a fine vernier input; and FIGURE 14 is a graph of an error curve for a tangent readout obtained in accordance with the invention herein contemplated.

To describe the construction of the device herein contemplated, it is first necessary to visualize the mathematical principles involved. Once the mathematical fundamentals have been grasped, the construction of the device in actual practice will be clearer.

Some synchro assemblies use coarse and fine synchros. The fine synchro acts as a vernier and turns at a speed which is a multiple of that of the coarse synchro. A fine reading is thus obtainable within the angle obtainable from the coarse synchro. To simplify the explanation of the invention, the initial part of the description is not concerned with coarse or fine synchros. Rather, it is assumed that there is a device, e.g., a resolver which furnished only the sine-cosine of an angle and from this information, the angle itself is to be obtained.

The present invention uses a ratio effect. By using a ratio effect, all that is required is the proper initial turns ratio of the input transformers to furnish values corresponding to the sine and cosine and a workable input of voltage and current above a certain threshold.

THE CIRCLE AND THE ARCS THEREOF USEFUL FOR THE PURPOSE OF THE PRESENT INVENTION

If a circle is divided into binary digits, the following arrangement may be used:

*Table 1*

| Degrees | Binary value | Decimal value |
|---|---|---|
| 360 | $2^{11}$ | 2048 |
| 180 | $2^{10}$ | 1024 |
| 90 | $2^{9}$ | 512 |
| 45 | $2^{8}$ | 256 |
| 22.50 (22½) | $2^{7}$ | 128 |
| 11.25 (11¼) | $2^{6}$ | 64 |
| 5.625 | $2^{5}$ | 32 |
| 2.8125 | $2^{4}$ | 16 |
| 1.40625 | $2^{3}$ | 8 |
| 0.703125 | $2^{2}$ | 4 |
| 0.3515625 | $2^{1}$ | 2 |
| 0.17578125 | $2^{0}$ | 1 |

As hereinbefore pointed out, the reason why it is difficult to provide an instantaneous angular readout from a sine or cosine value is because there is a lack of linearity in the sine or cosine curve. When plotted on graph paper, the tangent curve between 0° and 45° or the binary value of $2^8$, shown in Table 1 is fairly linear. Also, the curve can be readily divided into four segments or base binary positions as illustrated in Table 2.

*Table 2*

SIGNIFICANT TANGENT AND COTANGENT VALUES

| Degrees | Base position binary value | Tangent | Cotangent |
|---|---|---|---|
| 5 | | .0875 | |
| 10 | | .1763 | 5.6713 |
| 11¼ (11°15′) | $2^6$ | .1989 | 5.0276 |
| 15 | | .2680 | |
| 20 | | .3640 | 2.7475 |
| 22½ (22°30′) | $2^7$ | .4142 | 2.4142 |
| 25 | | .4663 | |
| 30 | | .5774 | 1.7321 |
| 33¾ (33°45′) | $2^6+2^7$ | .6682 | 1.4966 |
| 35 | | .7002 | |
| 40 | | .8391 | 1.1918 |
| 45 | $2^8$ | 1.0000 | |

Using the base positions shown in Table 2, it is possible to divide the 0° to 45° tangent curve into four straight lines. The tangent or cotangent is readily obtainable from the sine or cosine since sine $\theta = \cos\theta \times \tan\theta$; or, sine $\theta = \cos\theta / \cot\theta$. Since the currents compared must be proportional to the tangent the resistances are made proportional to cotangent values which are used to obtain desired results.

The object of the present invention however is not merely to provide an angle from 0 to 45 (or $2^8$) degrees, but to provide an angle value between 0° and 360° (or $2^{11}$). This is a value eight times the 45 (or $2^8$) degree arc; i.e., the 0 to 45 (or $2^8$) degree arc for which a value has been given in Table 2 is an octant of 360 (or $2^{11}$) degrees. To accomplish this, three basic problems must be solved. It is first necessary to determine the angle position within the 0 to 45 (or $2^8$) degree arc. The particular octant in which the angle is located must then be selected. And finally, the information from the coarse and fine synchros (if coarse and fine synchros are used to provide the sine-cosine information) must be interrelated.

THE 0° TO 45° OCTANT—BASE ANGULAR POSITIONS

Preferably the number of sections or sectors into which the basic 45° octant is divided for the purposes of the present invention should fit into the binary scheme. It may be 2, 4, 8, etc. In Table 2, four segments have been selected namely, 0° to 11¼°; 11¼° to 22½°; 22½° to 33¾° and 33¾° to 45°. This sector division is sufficient for most purposes and the invention will be described using these sectors although other binary values could be used for greater or lesser accuracy. Looking at Table 2, it is seen that the cotangent value of 22½° is about 2.414 and the cotangent value of 11¼° is about 5.03. These are workable resistor values and in fact for the 22½° branch a resistance value of 24.1K can be used while in the 11¼° branch a resistance value of 50K can be used. The reason why a 50K instead of a 50.3K resistance value is used is to pull up the segment curve. At the moment this point is not too important and will be explained subsequently in connection with the description relating to the error curve of the network. The foregoing resistor values have been arbitrarily chosen to give a current scale factor of tan 45°=1, corresponding to 1 milliampere, i.e., $1\times10^{-3}$. The 50K resistor value used in the 11¼° branch is thus a fortunate coincidence which facilitates computations.

To obtain the 33¾° base point in binary, both the 22½° and the 11¼° resistor branches must read "1," i.e.,

| Decimal reading | 45° | 22½° | 11¼° |
|---|---|---|---|
| Binary reading | $2^8$ | $2^7$ | $2^6$ |
| 33¾° | 0 | 1 | 1 |

The cotangent of 33¾° is 1.4966 or about 1.5. To obtain this value, the following parallel branch resistor arrangement is needed: 24.1K; 50K; and 186K; i.e., $$14{,}966=\frac{1}{\frac{1}{50}+\frac{1}{24.1}+\frac{1}{186}}$$

Figure 1:
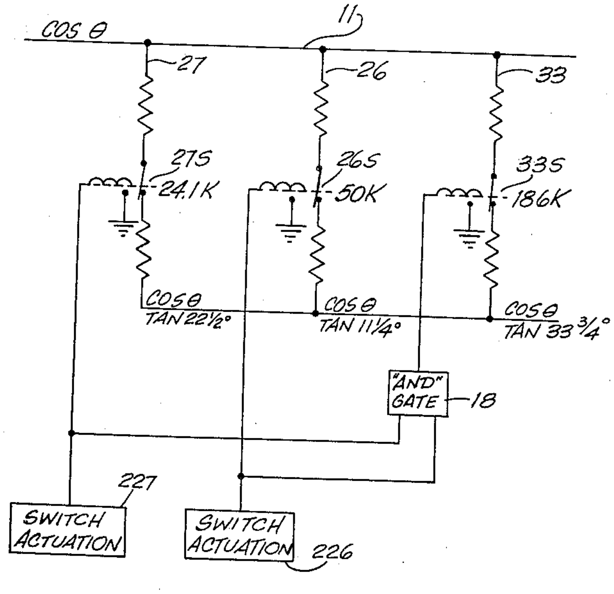
FIGURE 1 shows schematically a portion of the switch-resistor network herein contemplated used in connection with the coarse or base angular binary positions.

A circuit 11, using the foregoing resistor values is shown in FIGURE 1. To facilitate the understanding of the invention, each branch part number is related to the binary value of that particular branch, i.e., the 22½° or $2^7$ branch is numbered 27; the 11¼° or $2^6$ branch is numbered 26. Since 33¾° is not a binary, that branch is simply numbered 33. For the present, suffice it to say that each branch, 27, 26 and 33 of FIGURE 1 is controlled by a switch $\mathbf{27}_s$, $\mathbf{26}_s$ and $\mathbf{33}_s$. If an electrical potential corresponding to cos $\theta$ is applied across circuit 11, and current passes only through branch 27, the current value obtained is proportional to cos $\theta$ tan 11¼°; if both switches 26 and 27 are conducting, then "and" gate 18 acts on switch $\mathbf{33}_s$ to put branch 33 in parallel with branches 26 and 27.

If the digits selected were uniformly incremented between 0° and 45°, this would provide a linear interpolation of the angle which would have a high error factor. The present invention incorporates a non-linear interpolation which corresponds more closely to the tangent curve, which, between 0° and 45° is a monotonic increasing function.

As a preferred embodiment, the switches shown in FIGURE 1 are parallel to ground switches as opposed to series switches. Series switches might create noise in the system. To eliminate this noise parallel instead of series switches are used. Instead of only one resistor in each parallel branch, two resistors are used and the switch leading to the ground is placed between the two resistors. For the purposes of the present invention it is preferable that the resistor values on both sides of the switch be of equal value, i.e., 24.1K=12.05K+12.05K; 50K=25K+25K; and 186K=93K+93K. These resistor pairs in parallel branches provide the coarse or base binary positions.

THE 0° TO 45° OCTANT—FINE ANGULAR POSITIONS

Figure 2:
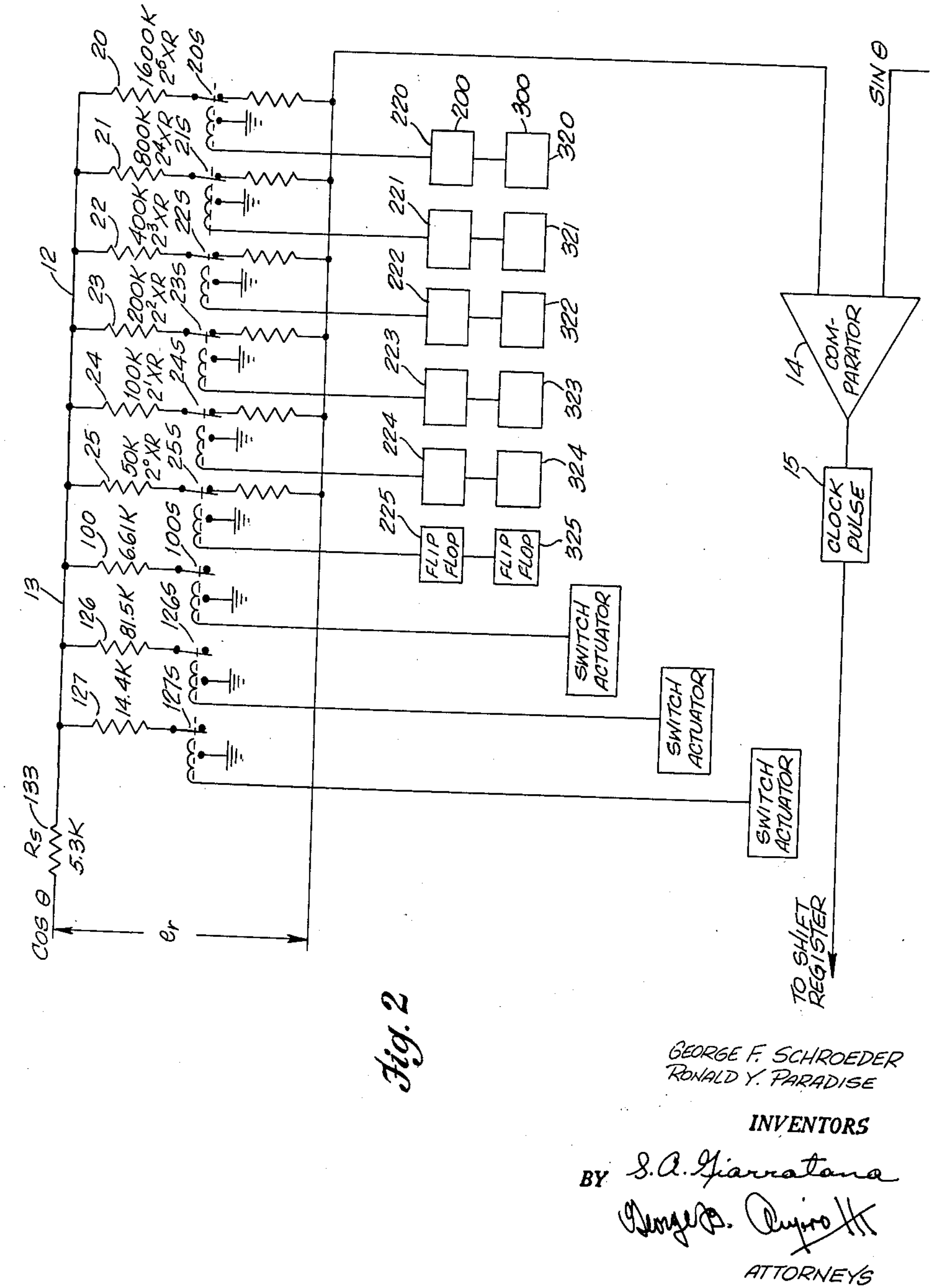
FIGURE 2 shows schematically a portion of the switch-resistor network herein contemplated used in connection with the fine angular values.
Figure 3:
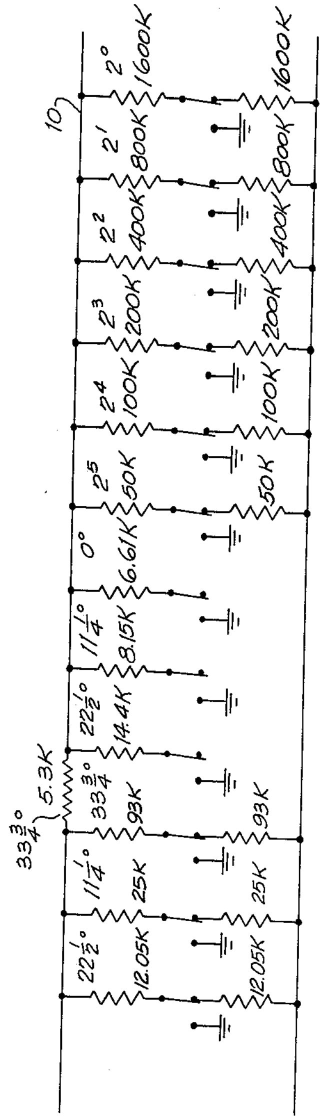
FIGURE 3 is a schematic and mathematical illustration of the assembled base and fine angular binary position resistor branches and the attenuating network interrelating the base and fine branches.

Fine binary digits shown in FIGURE 2 must be provided and incremented at the proper slope. However, from Table 1, it is apparent that tangent-cotangent values of binary values between 0.17578125° and 5.625° corresponding to the values used for the base binary positions cannot readily be selected. Other values must therefore be selected for the binary values between $2^0$ and $2^5$ for the fine angular positions and then the base and fine values must be interrelated. Since the fine values are not directly related to the base values, a convenient range must be chosen.

As is evident from Table 2, the tangent curve in the 0° to 45° octant is least linear between 33¾° and 45°. The fine values chosen and the interrelation of the coarse and fine values can take this situation into account and, as will be shown herein values selected will also correspond to the midpoint in the 33¾° to 45° arc, i.e., the linear increment will pass through the 39°22.5′ point.

Remembering that in each branch, two resistors are used with a switch thereinbetween and when any branch is in the network the switch is in the enabling position, while when not in the network the switch is in the shunted to ground position, if the base resistance value used in the fine branches is R, the total resistance of each branch of the fine values is shown in Table 3.

*Table 3*

FINE VALUES

| To pass current equal to— | The resistance value selected for branch No. | Is $2^x$×R |
|---|---|---|
| $2^5$ | 5 | $2^0$×R |
| $2^4$ | 4 | $2^1$×R |
| $2^3$ | 3 | $2^2$×R |
| $2^2$ | 2 | $2^3$×R |
| $2^1$ | 1 | $2^4$×R |
| $2^0$ | 0 | $2^5$×R |
| $2^n$ | n | $2^{5-n}$×R |
| $2^n$ | [1] n | $2^{m-n}$×R |

[1] Where the highest binary current value is $2^m$.

But in each branch, there are two resistors of equal value totalling to the foregoing values of Table 3.

Therefore, one resistor in any branch "$n$" will have a value of $2^n \times RH$ and the other a value of $2^n \times R\ (1-H)$ where H is the fractional value of one of the resistors in a branch to the total resistance of the branch.

INTERRELATING BASE AND FINE VALUES IN THE 0° TO 45° OCTANT

[33¾° to 45°]

Since a single line segment between 33¾° and 45° tends to provide the greatest tangent to angle error, the fine values are first interrelated to the coarse values in this angle arc. The problem is to select a value for R so as to have a tangent value closely related to 39°22.5′. Furthermore, the slope of the line is provided by attenuation between the coarse and fine values.

To calculate the attenuation required to provide the slope of the segment line the values required must first be listed.

*Table 4*

TABLE OF VALUES −45° TO 33¾°

| Angle degrees | Decimal digit | Binary digit | I=tan θ | DI[1] |
|---|---|---|---|---|
| 45° | 64 | 000 000 | 1 | ------ |
| 44°49.46′ | 63 | 111 111 | .99386 | .32568 |
| 39°22.5′ | 32 | 100 000 | .82068 | .15250 |
| 33°45′ | 0 | 000 000 | .66818 | .00000 |

[1] DI equals difference in current value between tan θ and tan 33¾°.

Remembering that two resistors are used in each branch and one of these resistors has a value of HR and the other resistor has a value of $R(1-H)$, the conductance into any branch "$n$" which is shunted to ground or $G_{nc}$ is $$G_{nc}=\frac{1}{(1-H)2^{5-n}R}=\frac{2^n}{(1-H)2^5R}$$

The difference in conductance $DG_n$ when a switch goes from the enabling to the shunted position is $$DG_n=\frac{2^n}{(1-H)2^5R}-\frac{2^n}{2^5R}=\frac{2^n-(1-H)^2}{(1-H)2^5R}=\frac{H}{1-H}\times\frac{2^n}{2^5R}$$

The total conductance $G_T$ is $$G_T=\sum_{n=0}^{n=5}\frac{2^n}{2^5R}+\sum_{n=0}^{n=5}y_n\frac{H2^n}{(1-H)2^5R}$$

where $y_n$ is 1 if the switch in the $n$th branch is shunted and $y_n$ is 0 if the switch in the $n$th branch is enabling. Therefore, $$G_T=\frac{2^5+2^4\ .\ .\ .\ +2^0}{2^5R}+\frac{H}{(1-H)32R}(y_0+2y_2+4y_2\ .\ .\ .\ +32y_5)$$

$$=\frac{63}{32R}+\frac{H}{(1-H)32R}\times Y$$

where $$Y=Y_0+2y_1+4y_2\ .\ .\ .\ +32y_5$$

If we let $x_n$ be the opposite of $y_n$, i.e., $x_n=1$ for the switch in the $n$th branch enabling and $x_n=0$ for the switch in the $n$th branch shunted and, $$X=x_0+2x_1+4x_2\ .\ .\ .\ +32x_5$$

then, $$X=63-Y$$

and, $$Y=63-X$$

so that $$G_T=\frac{63}{32R}+\frac{H(63-X)}{(1-H)32R}$$

$$=\frac{(1-H)63+H(63-X)}{(1-H)32R}$$

$$=\frac{63-HX}{(1-H)32R}$$

$$=\frac{1-\frac{HX}{63}}{1-H}\times\frac{63}{32R}$$

If we let Z be the total impedance of the network, since the impedance is the reciprocal of the conductance, $$Z=\frac{1}{G_T}=\frac{1-H}{1-\frac{HX}{63}}\ \frac{32R}{63}$$

and, if we let, $X'=X/63$; and, $R'=32R/63$, then, $$Z=\frac{1-H}{1-HX'}R'$$

The equivalent circuit of the fine network shown in FIGURE 2 is an input voltage $e_r$, a series resistance $r_s$, a shunted to ground resistance corresponding to all the shunted branches and a parallel in circuit resistance corresponding to all the enabling branches.

Now the voltage V across fine branches 12 of FIGURE 2 is to the total voltage $e_r$ as the total impedance of the fine branches Z is to the total impedance $R_s+Z$, or, $$V=\frac{Z}{R_s+Z}\times e_r$$

Remembering that the current flowing at the output point is only the current flowing through the enabling branches, the output current $i$ is equal to $$i=\frac{V}{\text{resistance of enabling branches}}$$

$$G_{\text{enabl}}=\sum_{n=0}^{n=5} x_n\frac{2^n}{2^5R}=\frac{X}{32R}$$

so $$i=\frac{VX}{32R}=\frac{Z}{R_s+Z}\left(\frac{X}{32R}\right)e_r$$

$$i=\frac{\frac{(1-H)R'}{1-HX'}}{R_s+\frac{(1-H)R'}{1-HX'}}\times\frac{X}{32R}\times e_r$$

$$=\frac{(1-H)R'}{(1-HX')R_s+(1-H)R'}\times\frac{x}{32R}e_r$$

$$=\frac{(1-H)X'e_r}{(1-HX')R_s+(1-H)R'}$$

Now the current "$i$" is the change in output current from $X=0$ to $X_n$ having some value (some branch or branches enabling). In effect therefore, "$i$" is the additional current output added to the current output flowing through the circuit providing values between 33¾° and 45°. Hence, $i$ from $X=0$ to $X=63$ must be proportional to the change in the tangent 0 from the point at the beginning of the arc to the point just before the end of the arc, i.e., from 33°45′ to 44°49.46′.

From Table 4,

Tangent 33°45′=.66818
Tangent 44°48.46′=.99386
DI=.32568

Hence the difference in tangent value to be accounted for by the fine network in this 33¾° to 45° arc is .32568, and, $$i_{44°49.40'}-i_{33^3/_4°}=.32568K$$

where K is some constant.

Now, $i_{44°49.40'}$ is the "$i$" when all branches are enabling or when $X=63$ and $i_{33^3/_4°}$ is the "$i$" when no branches are enabling or when $X=0$. Therefore $$\frac{(1-H)e_r}{(1-H)R_s+(1-H)R'}=0.32568K$$

$$.32568K=\frac{e_r}{R_s+R'}$$

$$R_s+R'=\frac{e_r}{.32568K}$$

And, it is also desired that one of the values provided corresponds closely to the midpoint between 33¾° and 45° or 39°22.5′. Again from Table 4, $$i_{39°22.5'}-i_{33^3/_4°}=.15250$$

but, $i_{39°22.5'}$ is the current only when branch number 25 or $2^5$ is enabling, i.e., when $X=32$. Therefore, $$.15250K=\frac{(1-H)32/63e_r}{\left(1-\frac{32}{63}H\right)R_s+(1-H)R'}$$

Since as hereinbefore pointed out, $$.32568K=\frac{e_r}{R_s+R'}\text{ and }R'=\frac{e_r}{.32568K}-R_s$$

and since H, K and $e_r$ are values which are either known or can be arbitrarily selected, we now have the following two equations with two unknowns:

$$.32568K=\frac{e_r}{R_s+R'}\qquad\text{(Equation 1}a\text{)}$$

$$.15250K=\frac{(1-H)32/63e_r}{\left(1-\frac{32}{63}H\right)R_s+(1-H)R'}$$

(Equation 1$b$)

$R_s$ and R′ can therefore be expressed in terms of H, K and $e_r$.

$$.15250K=\frac{(1-H)32/63e_r}{\left(1-\frac{32}{63}H\right)R_s+(1-H)\left(\frac{e_r}{.32568K}-R_s\right)}$$

$$=\frac{(1-H)32/63e_r}{\left(1-\frac{32}{63}H-1+H\right)R_s+(1-H)\frac{e_r}{.32568K}}$$

$$\left(1-\frac{32}{63}\right)HR_s=\frac{(1-H)\frac{32}{63}e_r}{.15250K}-(1-H)\frac{e_r}{.32568K}$$

$$R_s=\frac{(1-H)e_r}{H\left(1-\frac{32}{63}\right)K}\left(\frac{32}{63(.15250)}-\frac{1}{.32568}\right)$$

Since the two resistors in each branch are equal, H is ½. For K we can use the value initially assumed based upon $e_r$ being 10 volts making $K=1\times10^{-3}$.

Solving now for $R_s$ $$R_s=\frac{10}{\frac{31}{63}\times10^{-3}}\left(\frac{32}{63(.15250)}-\frac{1}{.32568}\right)$$

$$R_s=5.3\times10^3\text{ ohms}$$

Similarly solving now for R′

$$R'=\frac{e_r}{.32568K}-R_s=\frac{10}{.32568\times10^{-3}}-5.3\times10^3$$

$$=30.705-5.3=25.405K$$

and since, $$R'=\frac{32}{63}R$$

$$R=\frac{63}{32}R'=\frac{63}{32}\times25.405$$

$$R=50K$$

The base value of the fine branches is thus 50K.

The attenuation in series required between 33¾° and 45° or $R_s$ is 5.3K.

INTERRELATING BASE AND FINE VALUES

[33¾° to 22½°]

The values required are listed as in Table 4.

*Table 5*

TABLE OF VALUES—33¾° TO 22½°

| Angle degrees | Decimal digit | Binary digit | I=tan θ | D′I=D tan θ |
|---|---|---|---|---|
| 33°45′ | 64 | 1 000 000 | .66818 | ---------- |
| 33°34.5′ | 63 | 111 111 | .68377 | .24956 |
| 32°30′ | 0 | 000 000 | .41421 | .00000 |

The previous DI from Table 4 was .32568. The new D′I from Table 5 is .24956. In addition to the attenuator $R_s$ of 5.3K, additional attenuation is required. This attenuation is provided by a resistor in parallel with the binary network. It is thus necessary to find the value of this additional resistor.

Now, the resistance value of a resistor is to the total resistance value of the circuit as the voltage drop across the resistor is to the total voltage drops in the circuit.

The sum of all resistors in parallel to provide a current value of .32568 required in Table 4 is R′. If the new attenuation resistor $R_p$ is put in parallel with R′, the sum of all resistances in parallel is $$\Sigma R=\frac{R'R_p}{R'+R_p}$$

If we let
V be the voltage drop across $$\frac{R'R_p}{R'+R_p}$$

(across parallel branches R' and $R_p$); and, if we let E be the total voltage drop in the circuit, i.e., E is the voltage drop across $$R_s+\frac{R'R_p}{R'+R_p}$$

it can then be said that $$\frac{V}{E}=\frac{\frac{R'R_p}{R'+R_p}}{R_s+\frac{R'R_p}{R'+R_p}}$$

and $$V=E\times\frac{\frac{R'R_p}{R'+R_p}}{R_s+\frac{R'R_p}{R'+R_p}}$$

But, $D'I=V/R'$; and, $V=R'\times D'I$, therefore, $$V=R'\times D'I=\frac{E\times\frac{R'R_p}{R'+R_p}}{\frac{R'R_p}{R'+R_p}}\times\frac{R'+R_p}{R'+R_p}$$

$$\frac{D'I}{E}=\frac{1}{R'}\times\frac{R'R_p}{R_s(R'+R_p)+R'R_p}$$

$$\frac{D'I}{E}=\frac{R_p}{R'R_s+R_pR_s+R'R_p}=\frac{R_p}{R'R_s+R_p(R_s+R')}$$

$$R'R_s+R_p(R_s+R')=\frac{R_p\times E}{D'I}$$

$$R'R_s=R_p\times\frac{E}{D'I}-R_p(R_s+R')$$

$$R'R_s=R_p\times\left(\frac{E}{D'I}-R_s-R'\right)$$

$$R_p=\frac{R'R_s}{\frac{E}{D'I}-(R_s+R')}\qquad\text{(Equation II)}$$

Substituting the values given in Tables 4 and 5 and those obtained for Equation II, $$R_p=\frac{R_sR'}{\frac{E}{D'I}(R_s+R')}$$

$$R_p=\frac{5.3\times(30.705-5.3)}{\frac{10.00000}{.24965}-30.705}$$

$R_p=14.378K$, value of the resistance required for attenuation between 33¾° and 22½°.

INTERRELATING BASE AND FINE VALUES

[22½° to 11¼° and 11¼° to 0°]

Using Equation II, and constructing new Tables 6 and 7, the value of the resistance required for attenuation between 22½° to 11¼° and 11¼° to 0° can be calculated.

*Table 6*

TABLE OF VALUES—22½° TO 11¼°

| Angle degrees | Decimal digit | I=tan θ | D''I=D tan θ |
|---|---|---|---|
| 22.50° | 64 | .41421 | ---------- |
| 22°19.5' | 63 | .41064 | .21173 |
| 11°15' | 0 | .19891 | .00000 |

Additional resistance value $R_p'$ in parallel required for attenuation between 22½° and 11¼° is $$R_p'=\frac{R_sR'}{\frac{E}{D''I}-(R_s+R')}\qquad\text{(Equation II)}$$

$$R_p'=\frac{5.3\times(30.705-5.3)}{\frac{10.00000}{.21173}-30.705}$$

$R_p'=8.148K$

*Table 7*

TABLE OF VALUES—11¼° TO 0°

| Angle degrees | Decimal digit | I=tan Θ | D'''I=D tan Θ |
|---|---|---|---|
| 11°15' | 64 | .19891 | ---------- |
| 11°4.5' | 63 | .19574 | .19574 |
| 0° | 0 | 0 | ---------- |

Additional resistance value $R_p''$ in parallel required for attenuation between 11¼° and 0° is $$R_p''=\frac{R_sR_p}{\frac{E}{D'''I}-(R_s+R')}$$

$$R_p''=\frac{5.3\times(30.705-5.3)}{\frac{10.00000}{.19574}-30.705}$$

$R_p''=6.61K$

TANGENT-COTANGENT SWITCH RESISTOR NETWORK

The switch resistor arrangement 10 just described provides values which can be used with the cosine electrical equivalent value to equal the sine equivalent value or which can be used with the sine equivalent value to provide the cosine equivalent value of the angular position. Thus, there is a coarse network 11 for values of 11¼° (or $2^6$); 22½° (or $2^7$); and 33¾° (or $2^6+2^7$); a fine network 12 gives values between $2^0$ and $2^5$ in the binary code and an attenuation network 13 interrelates the slopes of the increasing digits between 0 and $2^6$ between $2^6$ and $2^7$; between $2^7$ and $2^6+2^7$; and between $2^6+2^7$ and $2^8$. To make the explanation of the network more vivid, the individual branches, switches, attenuators, and controlling flip-flops have all been numbered in such a way as to give a clue to their function. Resistor branch 27 is the branch used for an angle of 22°30' (or $2^7$); resistor branch 26 is the branch used for the 11°15' (or $2^6$) angle, and branches 20, 21, 22, 23, 24 and 25 correspond to the binary values of $2^0$, $2^1$, $2^2$, $2^3$, $2^4$, $2^5$. The switches bear the number of the branch they control and end in "s," so that switch $27_s$ controls branch 27 and switch $25_s$ controls branch 25. Associated with each switch controlling each branch are two flip-flops. Each flip-flop likewise bears a number related to the branch it controls. One set of flip-flops are numbered in the 200 series, the other set in the 300 series. The flip-flops associated with branch 27 are thus numbered 227 and 327, with branch 22, we have flip-flops 222 and 322, and with branch 20, we have flip-flops 220 and 320.

To provide the angle sensed by a synchro, the sine value provided by the device, i.e., sin θ is fed to a comparator 14. At this instant, none of the switches in the switch-resistor network are enabling and there is no cosine value entering comparator 14, passing through switch-resistor network 10. The output 14a from comparator 14 starts a pulse signal 15. Pulse signal 15 actuates shift register 300 which has a plurality of flip-flops, there being one flip-flop for each binary branch and it is to be remembered that branch 33 is not a binary branch.

Figure 4:
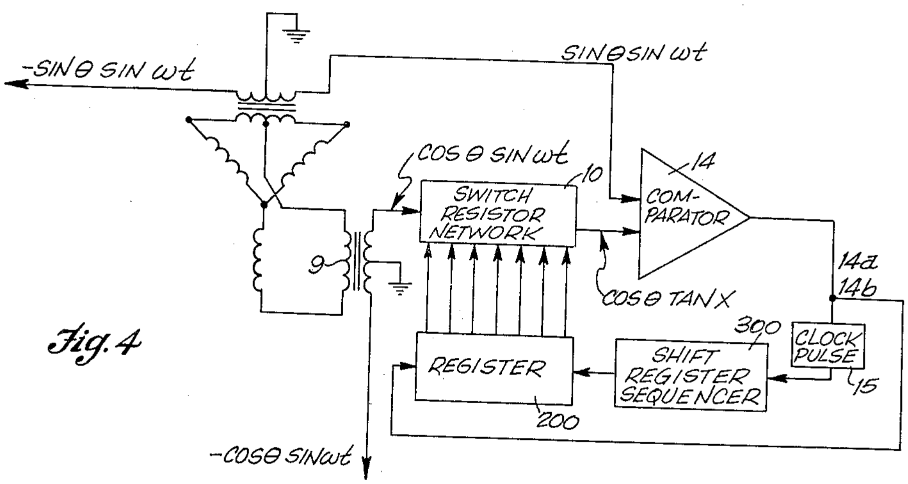
FIGURE 4 is a block diagram of the operation of the switch resistor network contemplated herein.
Figure 5:
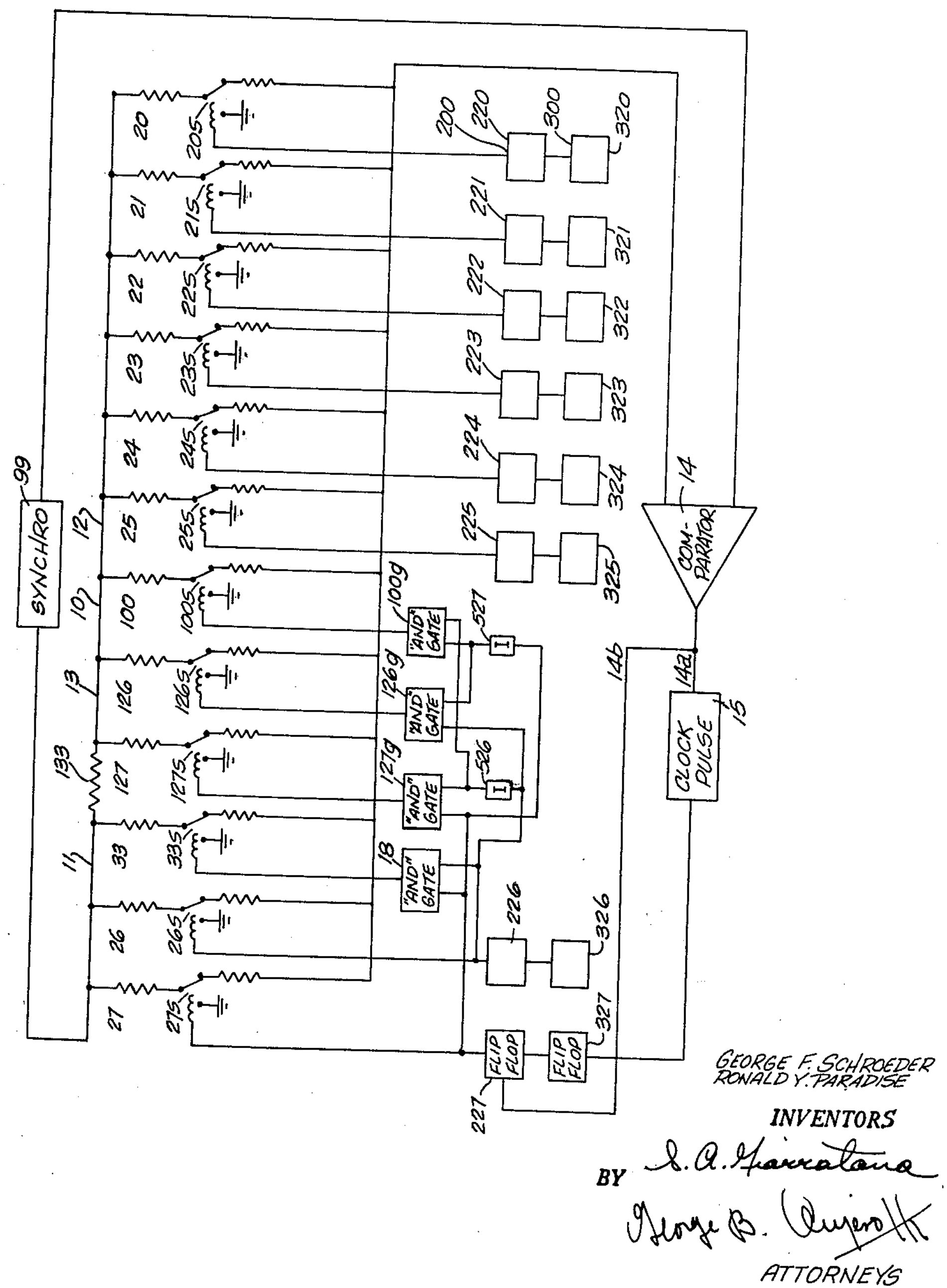
FIGURE 5 shows schematically the switch-resistor network depicted in FIGURE 4.

Each flip-flop in shift register 300 controls a flip-flop in a register 200. As shown in FIGURE 4, register 200 causes the switch-resistor network 10 to multiply the cosine value, cos $\theta$, entering the network by a value which will make it equal the sine $\theta$ entering the comparator 14. This provides a value cos $\theta$ tan $\theta$. As shown in FIGURE 5, the individual binary branches are controlled by flip-flops in the register and shift register. But branch 33 is not a binary branch. The attenuator for the 33¾° angle, register 133 which has been calculated to have a value of 5.3K is in series with the other branches. Therefore, when any of the coarse binary branches are enabling, the attenuator for that branch is shunted to the ground except of course attenuator 133 which is always in series. Branch 33 does not act alone but in parallel with branches 26 and 27. To accomplish this, a first "and" gate 18 is used. Whenever both branches 26 and 27 are enabling, "and" gate 18 will place switch $33_s$ in an enabling position, i.e., since it is a transistor switch, switch $33_s$ will be so biased as to conduct. When branch 33 is thus enabled, attenuators 126, 127 and 100 are shunted to ground. Additional "and" gates 126*g*, 127*g*, and 100*g*, control attenuators 127, 126, and 100. There are also two inverters, 526, and 527 associated with the three "and" gates 127*g*, 126*g*, and 100*g*. The action of the several attenuators with the respective "and" gates and inverters 526 and 527 is explained in Table 8.

*Table 8*

CONTROL OF ATTENUATOR NETWORK

| Angle | Coarse branches enabling | Attenuators shunted to ground | Action which takes place | | | | | |
|---|---|---|---|---|---|---|---|---|
| | | | Flip flop | Signal | Invert by— | Signal at "and" gate | | |
| | | | | | | 127 | 126 | 100 |
| 33.75 to 45 | All | None | 226 | 1 | 526 | 0 | 1 | 0 |
| | | | 227 | 1 | 527 | 1 | 0 | 0 |
| 22.50 to 33.75 | 27 | 127 | 226 | 0 | 526 | 1 | 0 | 0 |
| | | | 227 | 1 | 527 | 1 | 0 | 0 |
| 11.25 to 22.50 | 26 | 126 | 226 | 1 | 526 | 0 | 1 | 0 |
| 0 to 11.25 | None | 100 | 226 | 0 | 526 | 1 | 0 | 1 |
| | | | 227 | 0 | 527 | 0 | 1 | 1 |

For the purpose of giving those skilled in the art a better understanding of the invention, the following theoretical illustrative examples are given to show how the switch-resistor network provides the angle for angles of 10°, 20° 30° and 40°. These are only theoretical, not actual values.

To understand the examples, the coarse and fine networks are first theoretically combined in Table 9.

*Table 9*

THEORETICAL COMBINATION—COARSE AND FINE NETWORKS

| Branch | Binary number | Value in degrees |
|---|---|---|
| 27 | $2^7$ | 22.50 |
| 26 | $2^6$ | 11.25 |
| 25 | $2^5$ | 5.625 |
| 24 | $2^4$ | 2.8125 |
| 23 | $2^3$ | 1.40625 |
| 22 | $2^2$ | .703125 |
| 21 | $2^1$ | .3515625 |
| 20 | $2^0$ | .17578125 |

EXAMPLE I—ANGLE OF 10°

Upon a sine value being fed to comparator 14, output 14*d* causes pulse signal 15 to signal shift register 300. A pulse enters the first flip-flop 327 setting in turn flip-flop 227 in the register 200. Switch $27_s$ is enabled and permits current flow through branch 27 so as to furnish a current weighted for 22½°. This is too high and a second output 14*b* from comparator 14 fed to flip-flop 227 will bias transistor switch $27_s$ so that branch 27 is shunted to ground. The pulses then pass to flip-flop 326 where exactly the same sequence of events takes place. There is thus a value of zero in the coarse network. Passing to the fine network, the first flip-flop set is 325 which in turn sets flip-flop 225 passing current through branch 25 to give a value of 5.625. Since this value is less than the sin $\theta$ value, the signal to the comparator will be reversed in sign, which results in the next pulse allowing switch $25_s$ open and branch 25 remains enabling. The same happens with branches 24 and 23, both of which remain enabling. At this moment, the following value is furnished to comparator 14 through the switch-resistor network 10:

| | |
|---|---|
| $2^5$ | 5.625 |
| $2^4$ | 2.8125 |
| $2^3$ | 1.40625 |
| Total angle value | 9.84375 |

Binary values: $2^7$ $2^6$ $2^5$ $2^4$ $2^3$ $2^2$ $2^1$ $2^0$
Binary reading: 0 0 1 1 1 0 0 0

From branch 23 the pulse passes on to branch 22 which has a value of .703125. As this provides a value of over 10 degrees, the comparator input is again reversed and so in the next pulse switch $22_s$ is returned to its shorted position. The pulse then passes to branch 21 having a value of .3515625 also too high and finally to branch 20 with a value of .17578125 likewise too high and the foregoing binary value of 00111000 remains as the value for the 10° angle. The equivalent electrical network to 10° is shown in FIGURE 6.

EXAMPLE II—ANGLE OF 20°

The steps described for the 10° angle are repeated. The following branches remain enabling:

| | |
|---|---|
| $2^6$ | 11.25 |
| $2^5$ | 5.625 |
| $2^4$ | 2.8125 |
| $2^0$ | .17578125 |
| Total angle value | 19.8632125 |

Binary values: $2^7$ $2^6$ $2^5$ $2^4$ $2^3$ $2^2$ $2^1$ $2^0$
Binary reading: 0 1 1 1 0 0 0 1

The equivalent electrical network to 20° is shown in FIGURE 7.

EXAMPLE III—ANGLE OF 30°

The steps described for the 10° angle are repeated. The following branches are enabling:

| | |
|---|---|
| $2^7$ | 22.5 |
| $2^5$ | 5.625 |
| $2^3$ | 1.40625 |
| $2^1$ | .3515625 |
| Total angle value | 29.8828125 |

The equivalent electrical network at 30° is shown in FIGURE 8.

EXAMPLE IV—ANGLE OF 40°

The steps described for the 10° angle are repeated. The enabling branches are:

Branch 33—enabling, but not counter as a binary number—

| | |
|---|---|
| $2^7$ | 22.5 |
| $2^6$ | 11.25 |
| $2^5$ | 5.625 |
| $2^1$ | .3515625 |
| $2^0$ | .17578125 |
| Total angle value | 39.90234375 |

The equivalent electrical network at 40° is shown in FIGURE 9.

The values actually obtained in practice are better than the theoretical values demonstrated in the examples. The cotangent values for 11¼° and 22½° shown in FIGURE 1 were 5.0276 and 2.4142 respectively. But, resistors corresponding to these values were not used but instead lower value resistors were used, as will be subsequently shown in connection with the error curve, the effect of using these lower values of 50K and 24.1K is to pull up the error curve.

SELECTION OF THE 0° TO 360° OCTANT

The angle having been determined within the 0° to 45° are octant, it is now necessary to determine which of eight octants contains the angle.

FIGURE 10 depicts graphically and symbolically what happens during the sine and cosine cycle. As illustrated in FIGURE 10, there are sinusoidal outputs from both the synchro sine and cosine arms. Thus, at any given angle, the sine value of the synchro output may be either positive or negative, dependent on the angle selected. The same can be said of the cosine output.

As the synchro turns through 360° there is a phase shift. The cosine coil turns with respect to the primary input coil so that if there were a unidirectional means and a voltmeter past the cosine input, the cosine voltmeter would read maximum on one side at 0° swing right to zero at 90° and continue to maximum on the left at 180° to swing back towards the right and again reach maximum on the right at 360°.

Again looking at FIGURE 10, it is evident that the sine and cosine waves shown there corresponding to sin $\theta$ sin $wt$ and cos $\theta$ sin $wt$ really represent only what could be considered one half of a wave envelope. There is another half wave envelope corresponding to sin $\theta$ (sin $wt$) and cos $\theta$ (sin $wt$). So far, we have been considering the sine or cosine of the angle information without too much attention being paid to the alternating current instantaneous value which is $E$ max. sin $wt$ where $w=2f\times t$, $t$ being the instant of time at which the voltage is measured. The embodiment of the invention herein contemplated however can furnish angle information within micro seconds. The A.-C. reference voltage may thus be at either half of the cycle, at the instant of comparison.

Furthermore, as the present description is geared to human thinking rather than computer thinking, the cosine has been described as being fed to the switch-resistor network while the sine has been described as going to the comparator. In practice, it is advantageous to feed the highest value of sine or cosine to the switch resistor network with the lower value going to the comparator. The result will be that in octants 2, 4, 6, and 8, the register will provide an angle $\theta'$ which is equal to $90° - \theta$. In these octants, $\theta$ is obtained by inverting the binary value furnished by the register changing each "0" to "1" and each "1" to "0" and by the addition of "1" to the least significant digit. A new table incorporating these new factors is given in Table 11.

*Table 11*

| Octant | A.-C. cycle polarity of cos $\theta$ 0=+ 1=− | Polarity of sin $\theta$ 0=+ 1=− | Relative magnitude cos $\theta$ sin $\theta$=0 cos $\theta$ sin $\theta$=1 regardless of polarity | Phase of cos $\theta$ to ref 0=in 1=out | Inversion of $\theta$ register 0=No 1=Yes | 45° $2^8$ bit 0=Off 1=On | 90° $2^9$ bit 0=Off 1=On | 180° $2^{10}$ bit 0=Off 1=On |
|---|---|---|---|---|---|---|---|---|
| 1 (0–45°) | 0 | 0 | 0 | 0 | 0 | 0 | 0 | 0 |
| 5 (180–225°) | 0 | 0 | 0 | 1 | 0 | 0 | 0 | 1 |
| 2 (45–90°) | 0 | 0 | 1 | 0 | 1 | 1 | 0 | 0 |
| 6 (225–270°) | 0 | 0 | 1 | 1 | 1 | 1 | 0 | 1 |
| 8 (315–360°) | 0 | 1 | 0 | 0 | 1 | 1 | 1 | 1 |
| 4 (135–180°) | 0 | 1 | 0 | 1 | 1 | 1 | 1 | 0 |
| 7 (270–315°) | 0 | 1 | 1 | 0 | 0 | 0 | 1 | 1 |
| 3 (90–135°) | 0 | 1 | 1 | 1 | 0 | 0 | 1 | 0 |
| 4 (135–180°) | 1 | 0 | 0 | 0 | 1 | 1 | 1 | 0 |
| 8 (315–360°) | 1 | 0 | 0 | 1 | 1 | 1 | 1 | 1 |
| 3 (90–135°) | 1 | 0 | 1 | 0 | 0 | 0 | 1 | 0 |
| 7 (270–315°) | 1 | 0 | 1 | 1 | 0 | 0 | 1 | 1 |
| 5 (180–225°) | 1 | 1 | 0 | 0 | 0 | 0 | 0 | 1 |
| 1 (0–45°) | 1 | 1 | 0 | 1 | 0 | 0 | 0 | 0 |
| 6 (225–270°) | 1 | 1 | 1 | 0 | 1 | 1 | 0 | 1 |
| 2 (45–90°) | 1 | 1 | 1 | 1 | 1 | 1 | 0 | 0 |

Examining FIGURE 10, the following statements can be made:

I—The sine and cosine are of opposed polarity in octants 3, 4, 7 and 8.

II—Irrespective of polarity, the sine is greater than the cosine in octants 2, 3, 6, and 7

III—The phase of the cosine is opposite to the phase of the input primary reference in octants 3, 4, 5, and 6.

Using the foregoing information, a truth table can be constructed as follows:

*Table 10*

| Octant | I Sin and cos of opposed polarity Yes=1 No=0 | II Sine greater than cosine irrespective of polarity Yes=1 No =0 | III Cos and ref of opposed phase Yes=1 No=0 |
|---|---|---|---|
| 1 | 0 | 0 | 0 |
| 2 | 0 | 1 | 0 |
| 3 | 1 | 1 | 1 |
| 4 | 1 | 0 | 1 |
| 5 | 0 | 0 | 1 |
| 6 | 0 | 1 | 1 |
| 7 | 1 | 1 | 0 |
| 8 | 1 | 0 | 0 |

FIGURE 11 illustrates functionally the units required in connection with octant correction matrix 403. The units shown not only indicate the octant but apply the proper signals for conversion, i.e., the sine $\theta$ to cos $\theta$. Polarity detectors 401a and 401b will indicate the signal polarity and always direct that positive signals only be applied to the switch resistor network whether the signal be positive or negative. The magnitude detector 402 will not only detect relative magnitudes, but will always direct that the larger of the two signals be applied to the switch resistor network. Information 418 as to reference and cosine phase are also fed to octant correction matrix 403.

A more detailed schematic diagram of the conversion system is illustrated in FIGURE 12. The cos $\theta$ and sin $\theta$ functions are derived from a scott T transformer configuration which also allows for the required isolation from the three wire synchro 99. The secondary windings on the transformer are center-tapped to allow selection of positive input signals. Considering first the cosine, switches 404 and 405 select the proper input line from the transformer and this input is applied to buffer amplifier 406. But, whether sampled or not, the synchro has a constant load by virtue of load controlling switch 407*a*. The output of the buffer amplifier 406 is fed into a polarity detector 401*a* which senses a positive or negative signal. Upon detection, switches 404 and 405 are activated, allowing only a positive signal to be fed to buffer amplifier 406. Load controlling switch 407 is controlled by the positions of switches 404 or 405. If either of these two switches are open, 407 is closed. If both are closed, 407 is open.

The polarity detector consists of a polarity sensor 401*a* coupled to a flip-flop 408 through a pulse actuated sequence gating function 409. The timing sequence pulses are generated internally and control each function selection and detection chronologically. The device herein contemplated may be used to sample any one of a plurality of synchros in which case flip-flop 408 feeds a pair of "and" gates, for each synchro input, each pair of gates is controlled by a channel selector. The sin $\theta$ function operates in the same manner as the cosine with the following exceptions: Initially, the output of the buffer amplifier 410 is made positive to allow for the magnitude selection to take place. The outputs of buffer amplifiers 406 and 410 are summed through switches 411*a* and 412*a* kept open by flip-flop 413, into a third buffer amplifier 414 and the comparator amplifier 14. The inputs to buffer amplifier 414 are then of opposite polarity; therefore, the output will be positive or negative depending on the relative magnitudes of the input signal. Polarity sensor 415 associated with buffer amplifier 414 will upon receiving a positive signal open switches 411*a* and 411*b* and short switches 412*a* and 412*b* and do the reverse upon receiving a negative signal. This is done by means of flip-flop 413. One timing sequence or pulse later, flip-flop 416 on the sin $\theta$ side is inverted and all proper signals are applied to the comparison loop. The conversion takes place, the input to the register is open and the octant correction matrix corrects the binary digits 500 or readout, from the register by applying required digits 501 required by Table 11 or inverting the digits.

Since error may occur when angles very close to multiples of 45° are sampled, a level detector 417 detects polarities and magnitudes well within the accuracy requirement of the system.

COARSE AND FINE SYNCHRO

In some cases, the sine-cosine input will be furnished by a coarse and a fine device, the fine device acting as an angle vernier within the coarse device. As long as the sectors of the coarse synchro or input device can fit into the binary scheme, no problem will be encountered. In some cases, the coarse input device or synchro may be divided into 10° steps, or 36 sectors in 360°. This does not correspond to a power of 2. Consequently, the scale factor of the switch-resistor network must be modified and the sector correction is no longer simply a subtraction from or an addition to a power of 2.

FIGURE 13 illustrates in block diagram the conversion system used when the coarse angle indicator or synchro is not divided into sectors corresponding to a power of 2. To prevent ambiguity between the coarse and fine register readout, two extra digits are provided in the coarse network. These correspond to the two most significant digits of the fine synchro register readout. The two pairs of digits are compared and corrections made accordingly to the coarse synchro register. If the corresponding digits compare identically, no correction is necessary. Table 12 indicates the action necessary if they do not compare.

*Table 12*

| Fine digits $2^{10}$ | Synchro $2^9$ | Coarse digits $2^{10}$ | Synchro $2^9$ | Subtract 1—Yes=1, No=0 | Add 1—Yes=1, No=0 | Fault—Yes=1, No=0 |
|---|---|---|---|---|---|---|
| 0 | 0 | 0 | 0 | 0 | 0 | 0 |
| 0 | 0 | 0 | 1 | 1 | 0 | 0 |
| 0 | 0 | 1 | 0 | 0 | 0 | 1 |
| 0 | 0 | 1 | 1 | 0 | 1 | 0 |
| 0 | 1 | 0 | 0 | 0 | 1 | 0 |
| 0 | 1 | 0 | 1 | 0 | 0 | 0 |
| 0 | 1 | 1 | 0 | 1 | 0 | 0 |
| 0 | 1 | 1 | 1 | 0 | 0 | 1 |
| 1 | 0 | 0 | 0 | 0 | 0 | 1 |
| 1 | 0 | 0 | 1 | 0 | 1 | 0 |
| 1 | 0 | 1 | 0 | 0 | 0 | 0 |
| 1 | 0 | 1 | 1 | 1 | 0 | 0 |
| 1 | 1 | 0 | 0 | 1 | 0 | 0 |
| 1 | 1 | 0 | 1 | 0 | 0 | 1 |
| 1 | 1 | 1 | 0 | 0 | 1 | 0 |
| 1 | 1 | 1 | 1 | 0 | 0 | 0 |

An addition of +1 to the register reading requires that the binary number 000 000 001 be added to the register reading. The substraction of −1 is obtained by adding binary number 111 111 111 to the register reading. But before the ambiguity operation can be performed, the coarse synchro register reading must be corrected for each 45° octant. Table 13 indicates the correction operation required for each sector. The addition of 90°, 180° or 270°, requires that the binary numbers shown in the table be added to the register reading. To perform the substraction operation, addition is used as follows:

(Equation A)

$$\theta=C-\theta'$$

where C is the binary number for 90°, 180°, 270° or 360° and $\theta'$ is the number in the register readout.

We can define $\theta_1$ (or $\theta$ inverted) as (Equation B)

$$\theta_1=2^9-1-\theta'$$

(Equation C) therefore by rearranging Equation B, we obtain $$\theta'=-\theta \text{ inverted}+2^9-1$$

(Equation D) and substituting Equation C into Equation A:

$$\theta=C+1+\theta \text{ inverted}-2^9$$

But for a $2^9$ system, $2^9$ does not contribute into the system.

(Equation E) so that $\theta=C+1+\theta_1$ (and $2^9$ can be dropped out)

Thus, all constants are simply summed into a standard adder.

Table 13 indicates the operation in each sector.

The operation sequence of the coarse synchro conversion will be:

(1) Perform conversion identical to fine synchro conversion.
(2) Invert coarse register if necessary.
(3) Add C.
(4) Perform ambiguity operation.

*Table 13*

| Octant | Correction operation | Action |
|---|---|---|
| 1 (0-45°) | $\theta=\theta'$ | Add 00000000. |
| 2 (45-90°) | $\theta=90-\theta'$ | Invert $\theta'$ and add 00100101. |
| 3 (90-135°) | $\theta=90+\theta'$ | Add 00100100. |
| 4 (135-180°) | $\theta=180-\theta'$ | Invert $\theta'$ and add 01001001. |
| 5 (180°-225°) | $\theta=180+\theta'$ | Add 01001000. |
| 6 (225-270°) | $\theta=270-\theta'$ | Invert $\theta'$, and add 01101101. |
| 7 (270-315°) | $\theta=270+\theta'$ | Add 01101100. |
| 8 (315-360°) | $\theta=360-\theta'$ | Invert $\theta'$ and add 100100001. |

The error curve readout obtainable from a device of the type described is plotted in FIGURE 14. As shown in the error curve, it is possible to pull up the centers of the curve by pulling up the ends for each segment. This is done by using $x$ resistors having a total resistance value slightly less than the value corresponding to the cotangent in each of the coarse digit branches, i.e., branches 26 and 27. This is particularly necessary in segment number 2 between 11¼° and 22½°. The use of the resistance values described in the specification rather than the theoretically obtained values pulled up the sides of the segment number 2 curve and consequently pulled up the center of the curve.

In describing the invention herein contemplated, emphasis has been laid on a description of the overall system rather than on the individual components of the system. In practice, the angle readout can be provided in a few microseconds. To accomplish this, it is preferable to use the transistor switch arrangement described in our copending U.S. patent application Serial No. 2,670 filed on January 15, 1960. The buffer amplifiers are A.-C. wide band amplifiers receiving as an input a gated pulse at a 40 kc. rate. The amplifier, after a period of a few microseconds presents the amplified signal on its output and this output must remain proportional to its input within the error permitted in the system over one sampling period. With a sampling period of about 15 microseconds, the low frequency cutoff need only be in the order of 50 c.p.s. to prevent droop with the accuracy demanded by the system. A conventional A.-C. amplifier with high feedback will meet these requirements. Little has been said as to the readout means since readout means are well known in the art. The readout is actuated by the register and can be displayed in a visible readout or can be fed to conversion means to convert the binary reading to a decimal reading. The comparator is known in the art and mentioned in "The International Dictionary of Physics and Electronics," D. Van Nostrand Company, Inc., 1956, page 1621 and Millman and Taub, "Pulse and Digital Circuits," McGraw-Hill, 1956 edition, page 483.

The arrangement herein described provides the output desired by means of a ratio effect. This is particularly advantageous since line voltage errors are thus canceled out.

It is to be observed therefore that the present invention contemplates a device which provides for a digital value analogous to an angle sensed by a sine-cosine source, e.g., a resolver or synchro 99, and comprises, in combination, a coarse network 11 into which is fed one of said sine-cosine outputs, having a plurality of parallel branches providing base binary values corresponding to the tangent-cotangent of a plurality of base angular binary positions in the 0° to 45° circle octant; a fine network 12 associated with said coarse network having a plurality of binary branches providing fine binary values between said base binary values; an attenuation network 13 interrelating said coarse and fine network values; overload switch means for said branches so biased as to permit current flow through a branch when the potential to the branch controlled by said switch towards the source is higher than the potential to the branch from the source; a comparator 14 into which is fed the other of the sine-cosine outputs from said source and the output from said network a shift register 300 actuated by the output from said comparator 14; a register 200 actuated by said shift register 300 controlling the overload switch means, providing angle binary values analogous to tangent-cotangent values of between 0° and 45° magnitude detection means 402 adapted to detect whether the cosine is greater than the sine; polarity detection means **401*a* and 401*b* adapted to detect the polarity of the sine and cosine; and phase detection means 418 adapted to determine the phase of the cosine voltage to the input voltage, octant correction means 403** receiving the outputs magnitude, polarity and phase detection means, adapted to adjust said register tangent-cotangent value to provide a digital value analogous to an angle between 0° and 360°.

The invention herein described may also be used to provide a monotomic increasing function which can be treated as a plurality of straight line base points $P_1, P_2, \ldots P_{n-1}, P_n$. The base points intermediate the ends, i.e., points $P_2, P_3, \ldots P_{n-2}, P_{n-1}$, can be represented by base resistor branches. The values between two succeeding points being presented by linearly increasing fine resistor branches. The interrelationship between any two succeeding base points and the fine branches, i.e., the incremental slope of the individual straight lines between any two succeeding points is provided by an attenuator $R_p$ whose value is found according to the formula $$R_p=\frac{R'R_s}{\frac{E}{dI}-(R_s+R_p)}$$

and the series resistance $R_s$ between the base and fine branches to provide desired attenuation between the two highest points of the function $P_n$ and $P_{n-1}$ being provided by the formula $$R_s=\frac{E}{dI}-R'$$

Furthermore, as is readily apparent it is immaterial whether the function used are sine values or cosine values on the one hand and tangent values or cotangent values on the other hand, the proper function to use being readily understood by those skilled in the art. For this reason, in describing the invention, the terms sine-cosine; and tangent-cotangent have been used and by these hyphenated words, we simply mean whichever of the two functions required to perform the operation required in connection with the particular circuitry used. When not hyphenated these words mean the functions specified. Also, the terms binary, and binary value as used herein refer to values shown in Table 1, or a similar table devised for the type of device herein contemplated but having either a greater or a lesser accuracy than the device herein described. In Table 1, the binary value of $2^{11}$ has arbitrarily been assigned to 360°. If a coarse and fine synchro are used, there would not be too great a loss of accuracy if the binary value of $2^{10}$ were assigned to 360°.

Finally, in describing the present invention, use has been made of a tangent function to best illustrate the concept involved. Those skilled in the art will readily see that $$\tan=\frac{\sin\theta}{\cos\theta}=\frac{\sin\theta}{\sin(\theta+90)}$$

$$=\frac{\text{Sin}\,\theta}{(\text{Sin}\,\theta+k)}\quad(\text{where } k=90)$$

If $k$ has a value other than 90°, e.g., if $k=120°$ the resultant function would be analogous to a tangent function and could be used as the basis for a circuit similar to the network illustrated in the drawing. This may best be understood by looking at FIGURE 10 showing two identical sinusoidal curves ninety degrees apart. To obtain the tangent-cotangent, the instantaneous value on one curve is divided by the corresponding value on the other curve. If one curve is moved laterally with respect to the other, and the instantaneous values were divided, the resultant function could likewise be used for the purpose of the present invention. In the last analysis therefore, the invention provides an arrangement for converting angular relationship into digital units corresponding thereto, utilizing a rotatable source furnishing two outputs which are electrical values of the same kind, e.g., volts or amperes with respect to the angular position of said rotatable source which values may be represented as $\sin\theta$ and $\sin(\theta+k)$, where $\theta$ is the angular position of said source with respect to a base line and $k$ is a constant angular value other than a value where $\sin\theta$ is about equal to $\sin(\theta+k)$, i.e., where the two curves of FIGURE 10 will coincide. One of the outputs of said source is fed into a network adapted to furnish electrical digital values corresponding to the function $$\frac{\sin\theta}{\sin(\theta+k)}$$

This network has overload switch means allowing only electrical values therethrough which are less than the values flowing thereto. The other output of said source is fed into comparator means into which is also fed the output from said network. Digital means responsive to said network provides digits corresponding to the electrical values passing through said network.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

We claim:

1. In a device of the character described, in combination; a sine-cosine source; a network adapted to furnish tangent-cotangent electrical equivalent values between about 0° and 45° into which is fed one output from said source; overload switch means allowing only electrical values through said network which are less than values flowing thereto; comparator means into which is fed the other of the outputs from said source and output from said network; and, logic means into which the sine and cosine outputs of said sine-cosine source are also fed to supply the arc of the circle in which the angle sensed by the sine-cosine source is located.

2. A device to provide an angle value comprising in combination, coarse and fine angle sine-cosine sensing sources; a network associated with each of said sources adapted to furnish tangent-cotangent electrical equivalent values between about 0° and about 45° into which is fed one output from its associated source; overload switch means allowing only electrical values through said networks which are less than values flowing thereto; comparator means associated with each network into which is fed the output from its associated network and the other of the outputs from its associated source; and anti-ambiguity means coupled between the outputs of each of said networks interrelating the least significant portion of the value of the output of the network associated with said coarse source and the most significant portion of the value of the output of the network associated with said fine source.

3. A device as claimed in claim 2 including logic means into which is fed the sine and cosine outputs of each source to supply the arc of the circle in which the angle sensed by each sine-cosine source is located.

4. A circuit to provide digits analogous to an angle sensed by a sine-cosine source comprising in combination, a network having a plurality of branches, each branch corresponding to a coarse or fine tangent-cotangent value, said coarse values corresponding to the tangent-cotangent values of a plurality of base angular binary positions in the 0° to 45° circle octant, said fine values corresponding to binary increments between successive coarse angle tangent-cotangent values; attenuation means coupled between the branches corresponding to said coarse values and the branches corresponding to said fine values to apportion said fine values between said successive base angular binary positions; overload switch means allowing only current flow through a branch when the potential to the branch towards the source is higher than the potential to the branch from the source; comparator means into which is fed the other of the outputs from said source and the output from said network, said overload switch means permitting only a potential value to be fed across said branch to said comparator means as will equal said other of the outputs from said source thus providing an electrical tangent-cotangent value across said network of between 0° and 45° corresponding to the angle of the sine-cosine source; and logic means into which is also fed the outputs from said sine-cosine source to supply the particular octant of a circle in which said angle is located.

5. A circuit as claimed in claim 4, said network branches being in parallel, there being a switch controlling each parallel branch.

6. A circuit as claimed in claim 5, wherein said network tangent-cotangent values are furnished by resistors in said branches.

7. A circuit as claimed in claim 6 wherein the resistance value of two of said coarse tangent-cotangent branches correspond to the cotangent of 11¼° and 22½°, the cotangent value of 33¾° being obtained by having said 11¼° and 22½° branches in parallel with a third resistor branch of a value such that the sum of the three resistor branches in parallel will correspond to the value of the cotangent of 33⅓°.

8. A circuit as claimed in claim 7, each branch having a switch shorted to ground when non-conducting and two resistors of equal value one on each side of said switch.

9. A circuit as claimed in claim 7, said logic means comprising sine and cosine magnitude detection means; sine and cosine polarity detection means; and, sine-cosine to input signal phase detection means.

10. A device as claimed in claim 7, where the resistance value selected for any branch $n$ which is to supply a current having a value of $2^n$ in the branches corresponding to the fine tangent-cotangent values is obtained by the formula $2^{m-n}\times R$ where $m$ is the power of 2 of the highest binary current value supplied by the fine tangent-cotangent values and R is the basic resistance value used in the branch supplying said highest binary current value.

11. A device as claimed in claim 10, where the $a$ series resistance value $R_s$ is used for attenuation between 45° and 33¾° to interrelate the coarse and fine tangent-cotangent branches the resistance value $R_s$ being obtained by the formula $$R_s=\frac{E}{DI}-R'$$

where DI is the difference in current to be accounted for by the total of all the fine binary branches between 45° and 33¾°, R' is the total resistance value of all the fine binary branches, and E is any voltage value which may be supplied to the network; and, parallel to ground resistors having a resistance values $R_p$, $R_p'$ and $R_p''$ are used for attenuation between 33¾° and 22½°; 22½° and 11¼°; and 11¼° and 0° respectively said values of $R_p$, $R_p'$ and $R_p''$ being each obtained by the formula $$R_p \text{ (or } R_p' \text{ or } R_p'')=\frac{R'R_s}{\dfrac{E}{D'I \text{ (or } D''I \text{ or } D'''I)}-(R_s+R')}$$

where D'I, D''I, or D'''I respectively are the difference in current to be accounted for by the total of all the fine binary branches between 33¾° and 22½°; 22½° and 11¼° and 11¼° and 0°.

12. A network arrangement to provide an electric current corresponding to a monotonic increasing function by treating the function as a plurality of straight line base points $P_0$, $P_1$, $P_2$ . . . $P_{n-1}$, $P_n$ where $P_0$, $P_1$, $P_2$ respectively represent the beginning of the function, the first point, and the second point, and $P_{n-1}$, and $P_n$ respectively represent the point before the end of the function and the end of the function, said arrangement comprising in combination:

a plurality of parallel base resistor branches corresponding to the values of the succeeding point; $P_1$, $P_2$ . . . $P_{n-1}$, other than points $P_0$ and $P_n$, a plurality of linearly increasing parallel fine resistor branches corresponding to increasing bit values between any two succeeding points;

and, an attenuator for each one of said base points other than said point $P_n$ at the end of said function providing the incremental slope interrelating said one base point and the next succeeding higher base point, the attenuation between the two highest points of the function, $P_{n-1}$ and $P_n$ being provided by a series resistance $R_s$ the value of $R_s$ being provided by the formula $$R_s=\frac{E}{dI}-R'$$

and, the parallel attenuation resistance value $R_p$ between any two selected succeeding base points other than said two highest points being provided by the formula $$R_p=\frac{R'R_s}{\frac{E}{dI}-(R_s+R')}$$

where $dI$ is the difference in current to be accounted for by the total of all the fine resistor branches between said selected two succeeding points; and R′ is the total resistance value of all the fine resistance branches. And E is any input voltage to the network.

13. An arrangement for converting angular relationship to digital units corresponding thereto, comprising in combination, a rotatable source furnishing two outputs which are electrical values of the same kind with respect to the angular position of said rotatable source which output values may be represented as $\sin\theta$ and $\sin(\theta+k)$ where $\theta$ is the angular position of said source with respect to a base line and $k$ is a constant angular value other than a value where $\sin\theta$ is about equal to $\sin(\theta+k)$; a network into which is fed one of said outputs, said network including resistor branches adapted to furnish electrical digital values corresponding to the function.

$$\frac{\sin\theta}{\sin(\theta+k)}$$

and overload switch means for the digital resistors branches allowing only electrical values therethrough which are less than the values flowing thereto; comparator means into which is fed the other output from said source and the output from said network; and, digital means responsive to said network providing the digits corresponding to the electrical values passing through said network.

References Cited in the file of this patent

UNITED STATES PATENTS

| | | |
|---|---|---|
| 2,497,208 | Coggeshall | Feb. 14, 1950 |
| 2,781,970 | Kaufman | Feb. 19, 1957 |
| 2,872,670 | Dickinson | Feb. 3, 1959 |
| 2,914,250 | Honore et al. | Nov. 24, 1959 |
| 2,950,052 | Knox | Aug. 23, 1960 |

UNITED STATES PATENT OFFICE
CERTIFICATE OF CORRECTION

Patent No. 3,071,324 January 1, 1963

George Schroeder et al.

It is hereby certified that error appears in the above numbered patent requiring correction and that the said Letters Patent should read as corrected below.

Column 20, line 60, beginning with "12. A network arrangement to provide" strike out all to and including "voltage to the network." in column 21, line 22, comprising claim 12; column 21, line 23, for "13." read -- 12. --; in the heading to the printed specification, line 8, for "13 Claims." read -- 12 Claims. --.

Signed and sealed this 23rd day of July 1963.

(SEAL)
Attest:

ERNEST W. SWIDER
Attesting Officer

DAVID L. LADD
Commissioner of Patents